Figure 1:
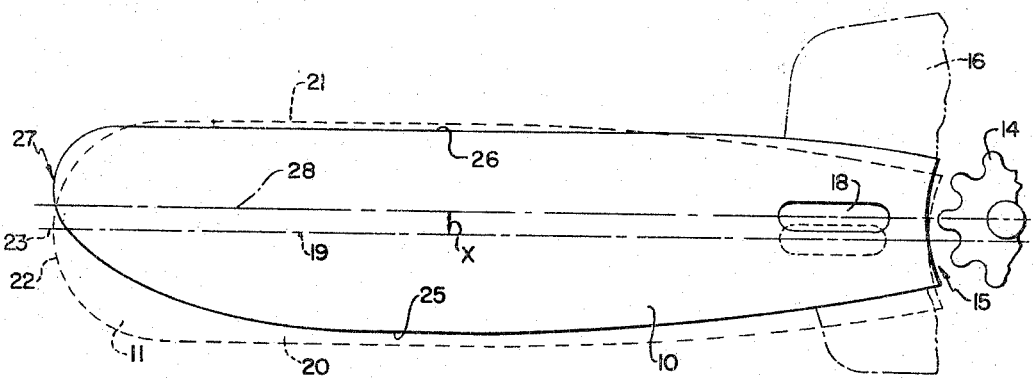

June 6, 1967   E. W. LAHTINEN   3,323,561
CHAIN SAW CUTTER BAR
Filed Nov. 23, 1964

INVENTOR
ELMO W. LAHTINEN
BY
Fetherstonhaugh & Co.
ATTORNEYS

United States Patent Office 3,323,561
Patented June 6, 1967

3,323,561
CHAIN SAW CUTTER BAR
Elmo W. Lahtinen, Port Renfrew, British Columbia, Canada
Filed Nov. 23, 1964, Ser. No. 412,930
4 Claims. (Cl. 143—32)

This invention relates to power driven chain saws, and in particular to the cutter bar thereof.

The development of chain saws, of which there are many and varied types, has resulted, in the main, a saw employing an endless cutting chain supported on a frame, commonly called a cutter bar, and driven easily by a light internal combustion motor. The requirements of the lumbering industry has resulted in the development of a cutter bar having a thin elongated shape symmetrically shaped on both sides. The bar is fastened to the motor at one end and is free at the other so that the cutter bar may extend into the log or timber to be cut for its full length. In the operation of these chain saws, it is quite often necessary to perform a boring operation with the saw itself and in order to do this, the nose or free end of the chain saw must be held against the timber and gradually worked thereinto, the cut being very little wider than the depth of the bar and saw chain combined. In performing this operation, it is usually found that the cutter teeth entering into the bore are more effective than the cutter teeth leading the bore. This tends to kick the saw out of the bore being made and the operation may only be performed in safety by a very skilled operator. It has also been found that in the symmetrically shaped bars that portion of the saw chain entering the cut, during boring operation, becomes slack and the linkage elements thereof tend to bunch together, resulting in excessive vibration.

The present invention seeks to eliminate the objectionable features and chain saws having the symmetrically shaped cutter bars providing a cutter bar shaped so that, during a boring operation, there will be more cutter teeth on that side of the cutter chain leaving the bore than there will be on the other side thereof resulting therefore in the chain saw being drawn inwardly into the bore rather than being kicked outwardly thereof and which is so shaped as to eliminate the tendency of the chain to sag, and the links thereof to bunch, as has been hereinbefore described.

The present invention comprises an elongated chain saw cutter bar having a cutting run guide portion along one side edge, a return run guide portion along its opposite edge and a curvate outer end guide portion extending between said edges, said end portion being formed so that the degree of curvature thereof is lesser at the cutting run guide portion side of the bars medial line than it is on the other side of said line.

Figure 2:
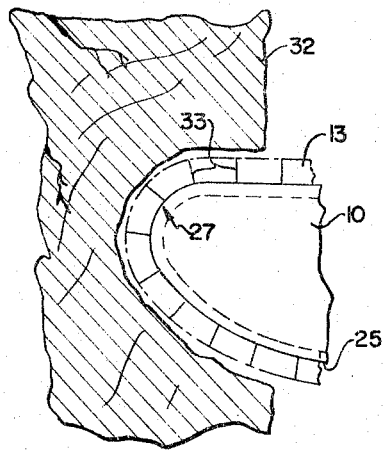
Figure 3:
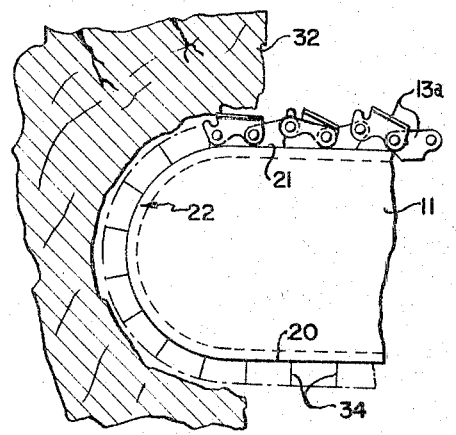
Figure 4:
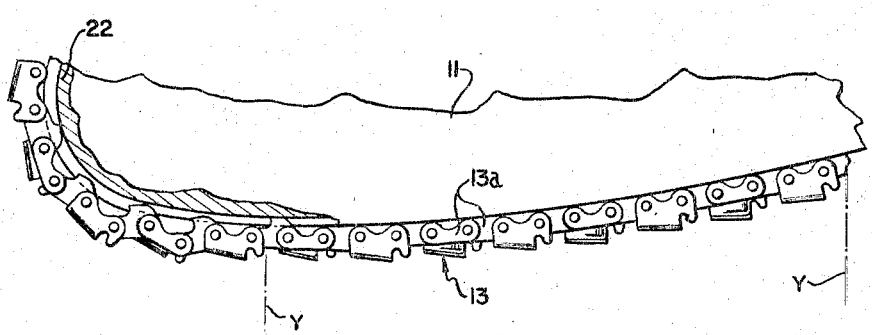

In the drawings which illustrate the invention,

FIGURE 1 is a side view showing in solid lines a cutter bar in accordance with the present invention, and in dotted lines superimposed thereover, a cutter bar of the same size having a symmetrical shape about its medial axis, FIGURE 2 is a side view partly diagrammatic of a nose portion of a saw in accordance with the invention showing the action of the saw chain cutter teeth when the saw is used in a boring operation, FIGURE 3 is a view similar to FIGURE 2, showing a saw having a symmetrically shaped cutter bar, showing the action of the saw teeth when the saw is used in a boring position, and FIGURE 4 is a view in elevation of a portion of a chain saw illustrating the bunching of the links thereon.

Referring to the drawings, and particularly to FIGURE 1 thereof, there is shown in solid lines the outline of a cutter bar constructed in accordance with the invention and indicated generally by the numeral 10, and in dotted lines, superimposed thereover, the outline of a cutter bar in general use today, the last-mentioned cutter bar being indicated generally by the numeral 11.

In general, cutter bars are formed of high quality thin flat steel sheet and are usually elongated in shape, as indicated by both cutter bars 10 and 11, having their edges honed or ground to serve as tracks for the saw chain. The saw chain, a portion of which is shown in FIGURE 4 and indicated by the numeral 13 is formed of pivotally interconnected links 13a extending as an endless chain around the periphery of the bar and around a sprocket 14 adjacent the inner end 15 of the bar driven by a motor 16, (shown in FIGURE 1), to which said inner end of the cutter bar is secured. The means of securing the bar to the motor may be effected in many ways, one of the ways being by having longitudinally formed slots 18 formed in the face of the bar adapted to snugly receive appropriate bolts or the like, not shown, extending from the motor. These means of mounting are varied and well known and need not be discussed further in this application.

A standard, or usual cutter bar as indicated by the numeral 11 is usually symmetrical in shape about its medial line, the latter being indicated by the numeral 19, and has its cutting run guide portion 20 and its return run guide portion 21 both convexly formed longitudinally of the bar, the degree of curvature of each being substantially equal. The outer or nose end 22 of the cutter bar 11 is usually formed as a simple circular curve lying tangentially to each of said guide portions 20 and 21, and having an equal length on curve of either side of said medial line 19, the latter line being a line extending parallel to the longitudinal axis of the cutter bar extending to the outermost section or tip 23, which in the case of cutter bar 11, bisects its curved outer end 22.

Cutter bar 10 is elongated in the same manner as cutter bar 11 having cutting and return run guide portions 25 and 26 respectively, and a curved outer end or nose 27. Cutter bar 10, however, is asymmetrically shaped in that its outer end 27 is formed as a spiral easement curve, the degree of curvature thereof gradually decreasing from a tangential juncture with a return portion 26 towards its juncture with the cutting run portion 25. Furthermore, the cutting run guide portion is formed having a greater degree of curvature than its return run guide portion 26, the last-mentioned portion being substantially straight. It will be seen by referring to FIGURE 1 that the medial line indicated by the numeral 28 of cutter bar 10 does not coincide with the medial line 19 of bar 11 but is offset towards the return run guide portion of the bar a distance indicated upon FIGURE 1 by the letter X. The medial line 28 therefore does not bisect the outer end 27 of the bar. The length of curvature of the outer end portion of the bar 10 lying in the return run guide portion of the medial line is therefore shorter than the length of curvature of the said outer end portion lying on the opposite or cutting run guide portion of the medial line. The advantages inherent in chain saws having a cutter bar shaped as cutter bar 10 over a chain saw having a cutter bar shaped as cutter bar 11 when the saw is to be used in a boring operation, is illustrated in FIGURES 2 and 3.

In FIGURE 2, the cutter bar 10 is shown in a boring operation penetrating a piece of timber 32, the saw chain 13 being shown in diagrammatic form, the cutter teeth being indicated by the marks 33 spaced equidistantly from each other around the outer end 27 of said bar. It will be seen that only those cutter teeth which travel around said end portion come into cutting contact with the wood and as the length of curvature of that section of said outer end 27 is greater on the cutting run side of the medial line, than it is on the return run of the medial line, then there will always be more cutting teeth in contact with the wood on the former side than on the latter side. The pull upon the chain occasioned by the contact of the teeth with the wood as said teeth move about the cutter run side of the outer end 27 of the bar will overcome the outward pull of the cutter teeth on the return run side thereof, the net effect being an inward pull of the chain saw into the timber rather than outwardly and away from it.

The effect of the cutter bar 11, which is symmetrical about its medial line is the reverse of that of the cutter bar formed as cutter bar 10. Referring to FIGURE 3, wherein the chain saw having a cutter bar shaped as cutter bar 11 is shown, it will be seen that the cutter teeth thereof being diagrammatically represented by marks 34 in the same manner as the cutter teeth 33 as illustrated in FIGURE 2, take the form of a simple curve, co-inciding with the simple curvature of the outer end 22 of said cutter bar 11, resulting, therefore, in the wood being contacted by the same number of teeth on both sides of the medial line. However, as the operator of the chain saw must exert a pressure inwardly against the wood, those teeth lying on the return portion of said outer end 22 would tend to bite more deeply into the wood than the teeth on the other side of the medial line. The net force exerted by the shaw chain parallel to the longitudinal axis of the cutter bar will therefore be away from the timber making it necessary for the operator to use his weight to maintain the chain saw in contact with the timber.

The cutting and return run guide portions 25 and 26 respectively, of cutter bar 10, and cutting and return run guide portions 20 and 21 of cutter bar 11, respectively, are all formed as longitudinally extending convex curves. As shown in FIGURE 1 the curvature of said cutting and return run guide portions of cutter bar 11 are the same, making the bar symmetrical about its medial line, a feature which permits the bar to be reversed easily, that is, to be rotated 180° about its medial line so that the cutting run guide portion thereof becomes the return guide portion.

The design of cutter bars, as hereinbefore noted, has resulted in their being fashioned having an elongated shape, their width being a little more than the diameter of their outer ends 22, resulting therefore in the cutting and return run guide portions 20 and 21 having very little curvature.

Although this form of blade has one advantage in that it may be reversed, as hereinbefore set out, it has one great disadvantage. In order that the cutting run guide portion may be used as the return run guide portion, the long slim shape induces the saw chain links to tend to bunch together just before they enter the end of the kerf, when the saw in a bucking operation. In this operation, the outer end 22 usually extends beyond the trunk of the tree that has been felled, only the central portion of the saw chain between the letters y—y on FIGURE 4 engaging the wood. The length of chain throughout its distance y—y is therefore under tension and stretches slightly, thereby causing a total elongation of the chain and permitting the latter where it runs along the return run guide portion 21 and its outer end 22 to run more loosely than is desired, the chain tending to pull away from the outer end 22 and to bunch just before it enters the kerf in the timber being bucked. Where the cutter bar is slightly worn from extensive use and where the chain itself may have, due to wear, become slightly elongated, this bunching and loose fit sometimes results in excessive vibration of the chain saw and occasionally causes the chain to jump out of its track.

Cutter bar 10 on the other hand, by reason of the medial line 24 being closer to the return run guide portion 26, than the cutter run guide portion 25 thereof, permits a greater curvature in said cutter run guide portion without increasing the width of the cutter bar and as that portion of the outer end 27 lying on the cutter run guide portion side of the said medial line 24 is a spiral easement curve permitting it to be eased more gradually into the cutter run guide portion 25 than is possible with the symmetrical cutter bar 11, the saw chain can follow the curvature thereof more closely than it can follow the curvature of cutter bar 11 as the latter curvature changes abruptly from the relatively short radius of outer end 22 to the longer radius curvature of the cutting run guide portion 20 thereof. The saw chain used with cutter bar 10 therefore will not tend to loosen as much as the saw chain cutter bar 11 and the links thereof will therefore not tend to bunch in the manner hereinbefore described.

The action of a cutter bar formed in the manner of cutter bar 10 in reducing the tendency of a saw chain to loosen thereon, also eliminates the tendency of the cutter teeth to bunch when the saw is used in the boring operation. FIGURE 3 illustrates the normal bunching of cutter teeth when a chain saw having a cutter bar in the form of cutter bar 11, is used in a boring operation. This tendency of the teeth to bunch often results in the teeth taking too large a bite as they enter the kerf, an action which not only overstrains the chain, but increases the pull thereof out of the bore being made.

What I claim as my invention is:

1. A chain saw cutter bar of narrow elongated shape having a cutting run side edge and a return side edge and a curvate nose tangential to both edges for slidably guiding a saw chain from said return run side edge to said cutting run side edge, said nose being formed so that the degree of curvature thereof between the medial line of the bar and the return run side edge is greater than that between the medial line and cutting run side edge, whereby the length of the chain in contact with the nose on the cutting run side of the medial line will be greater than it is on the return run side thereof.

2. A chain saw cutter bar as claimed in claim 1 wherein the nose extends as a spiral curve increasing in degree of curvature from the cutting run side edge to the return run side edge.

3. A chain saw cutter bar as claimed in claim 1 wherein the cutting run side edge bows slightly outwardly from the medial line.

4. A chain saw cutter bar as claimed in claim 1 wherein the return run side edge extends substantially straight and parallel to the medial line of the bar.

References Cited

UNITED STATES PATENTS 1,588,563   6/1926   Wilson               299—82

FOREIGN PATENTS 657,445   2/1963   Canada.

DONALD R. SCHRAN, *Primary Examiner.*